United States Patent [19]
Crownover

[11] 3,915,850
[45] Oct. 28, 1975

[54] COMPONENT HANDLER AND METHOD AND APPARATUS UTILIZING SAME

[75] Inventor: Joseph W. Crownover, La Jolla, Calif.

[73] Assignee: GTI Corporation, Pittsburg, Pa.

[22] Filed: Nov. 14, 1973

[21] Appl. No.: 415,741

[52] U.S. Cl............. 209/74 M; 209/81; 324/158 T
[51] Int. Cl.² ........................................ B07C 5/08
[58] Field of Search......... 209/74, 73, 74 M, 75, 81; 324/158 T, 158 F; 74/3.52; 214/11 C

[56] References Cited
UNITED STATES PATENTS

| | | | |
|---|---|---|---|
| 3,581,889 | 6/1971 | Abraham | 209/81 R |
| 3,584,741 | 6/1971 | Schirmer | 209/81 R |
| 3,664,499 | 5/1972 | Sahakian | 209/81 R |
| 3,677,401 | 7/1972 | Chaparro et al. | 209/81 R |
| 3,761,806 | 9/1973 | Napor | 209/81 R |
| 3,834,531 | 9/1974 | Bollerup | 209/74 M |

Primary Examiner—Allen N. Knowles
Attorney, Agent, or Firm—George F. Smyth

[57] ABSTRACT

A component handler usable with a tester which tests components and provides testing signals which are indicative of the results of the test of such components. The component handler includes a holder for holding the components, a programmable ejector for ejecting the components from the holder in accordance with a program, and a device for programming the ejector in accordance with the testing signals.

21 Claims, 7 Drawing Figures

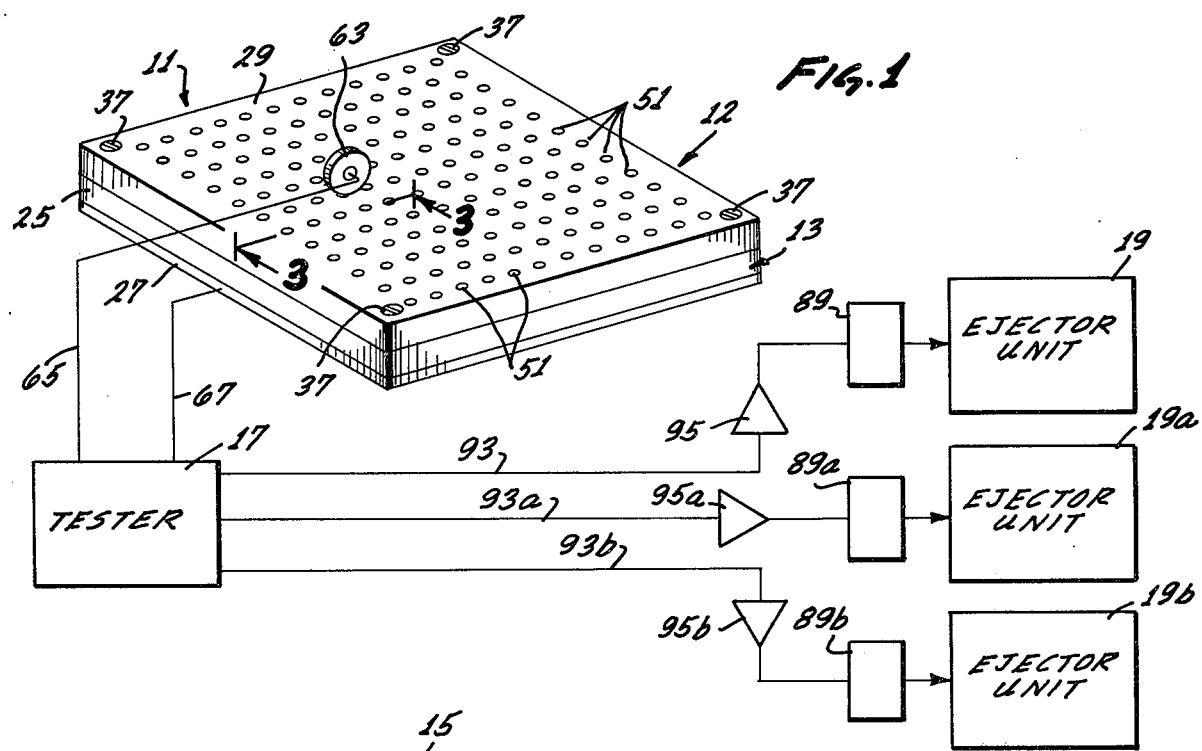
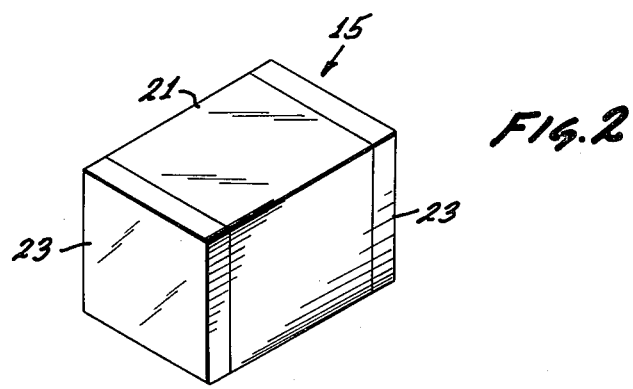
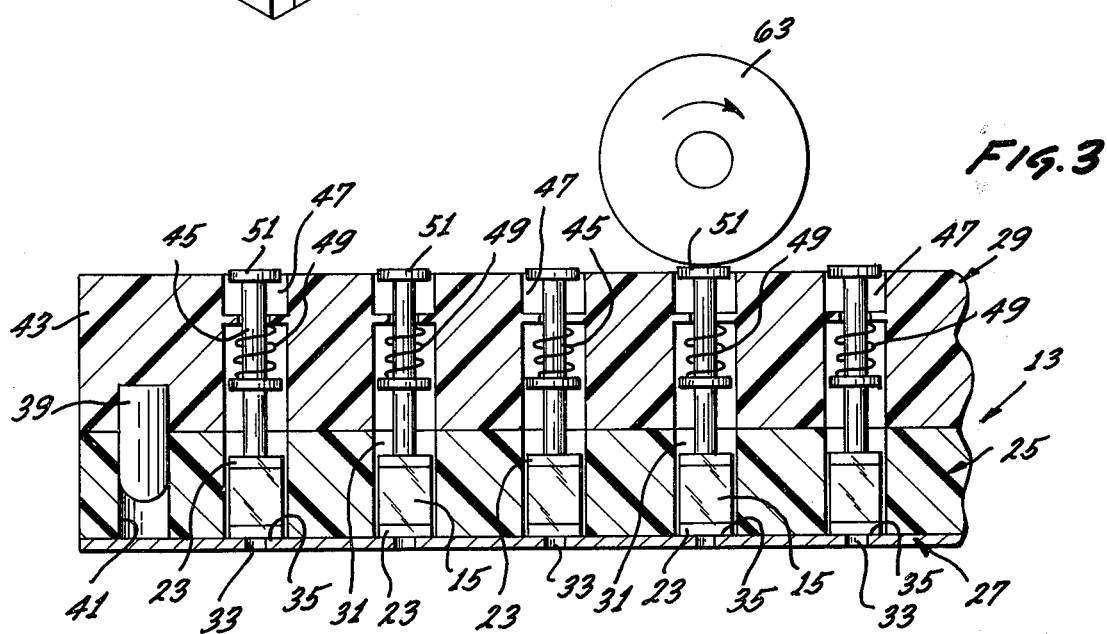

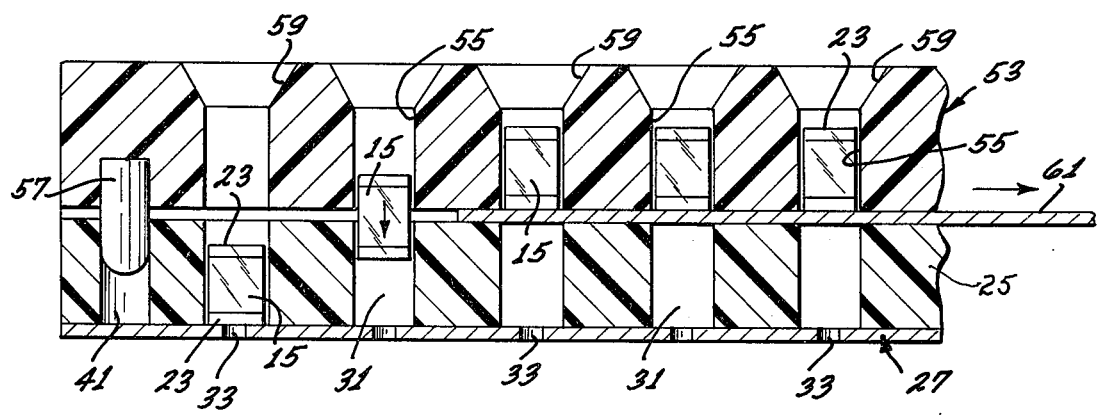
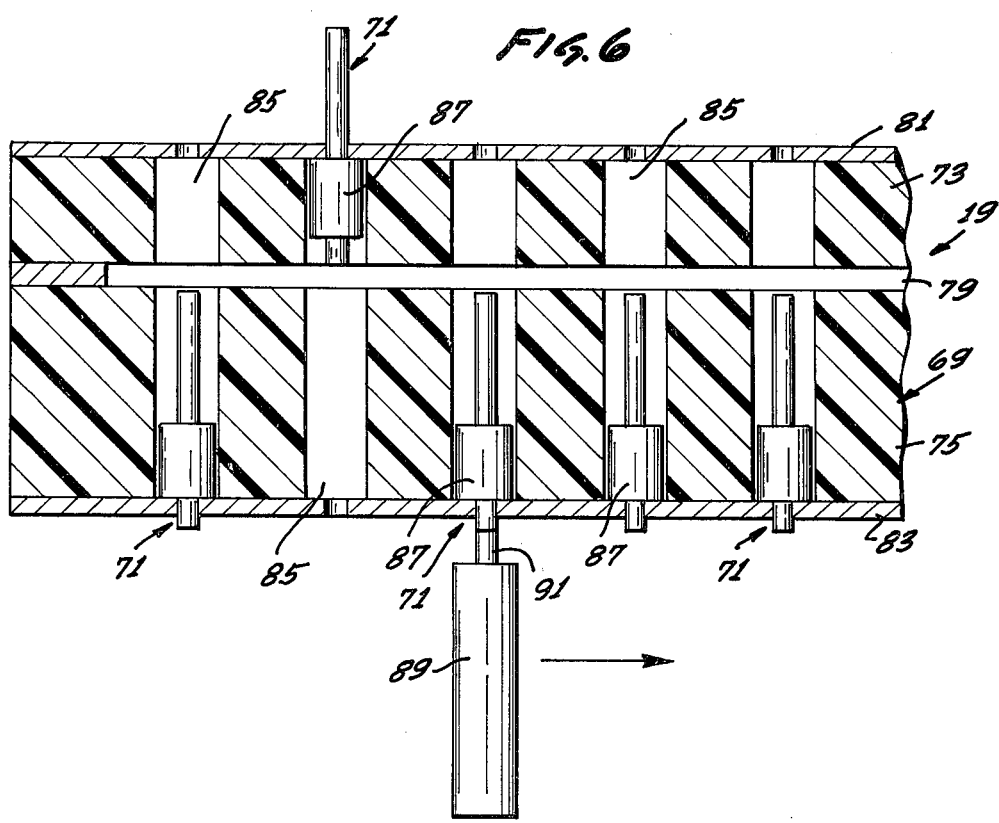

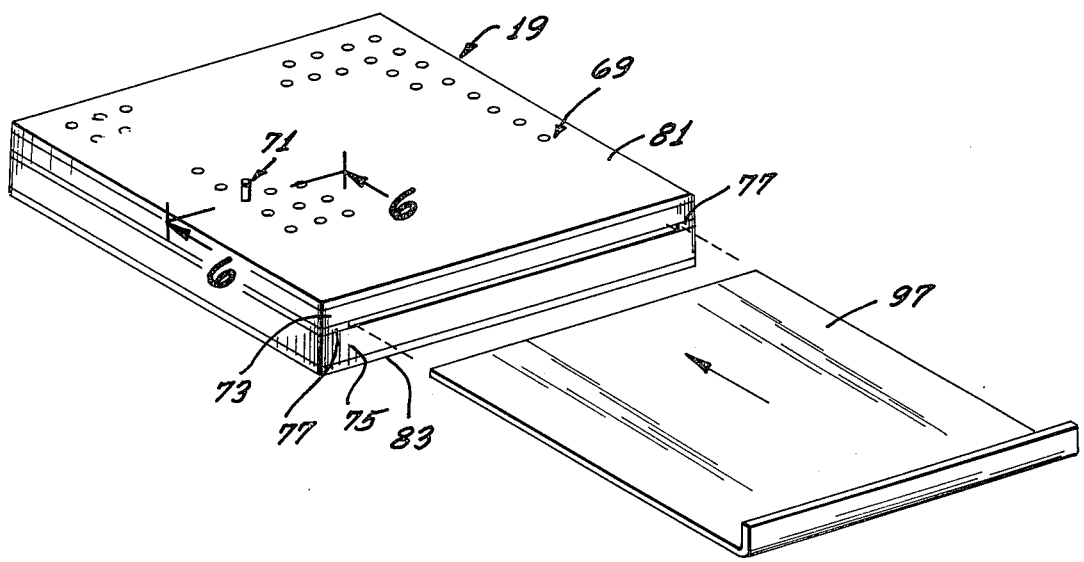
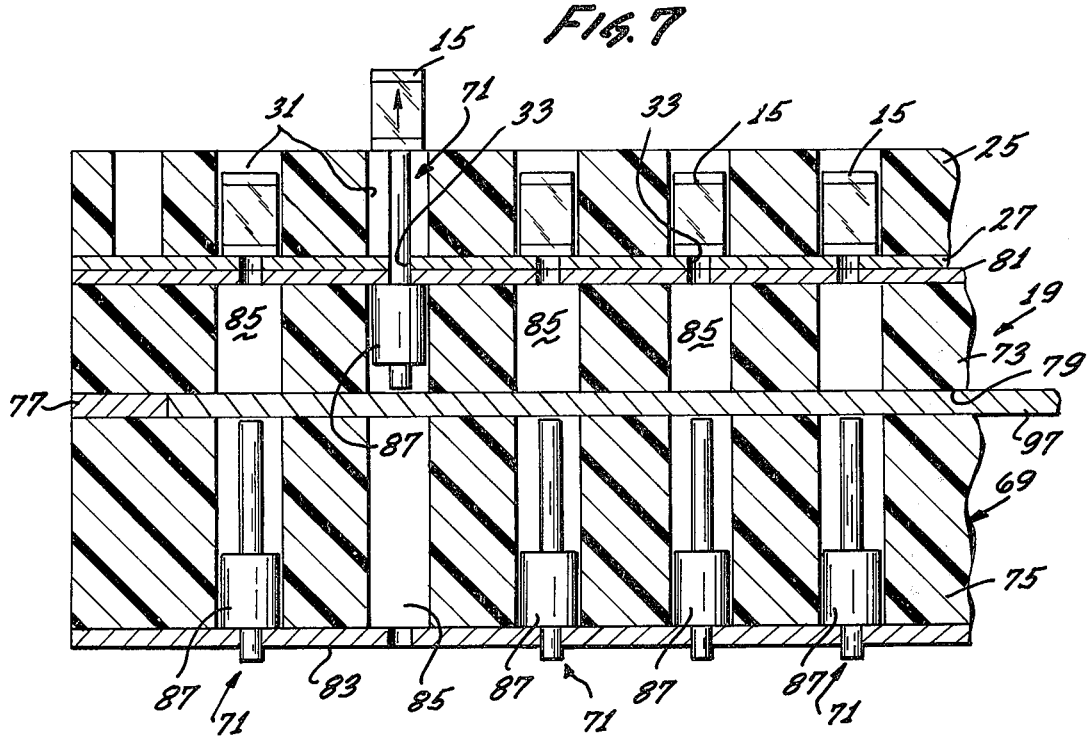

COMPONENT HANDLER AND METHOD AND APPARATUS UTILIZING SAME

BACKGROUND OF THE INVENTION

Various electrical components such as capacitors, diodes, and resistors are often made in the form of very small chips. Before using the chips, they must be subjected to various electrical tests and then sorted in accordance with the results of the test. In a typical case, a component is tested to assure that it meets appropriate specifications, and the sorting process then involves separating the acceptable chips from the rejects.

Prior art component handlers provide for testing and sorting only one component at a time. For example, one prior art component handler sequentially picks up the component, moves the component to a test jig where a tester electrically tests the component, and then moves the component to an appropriate bin depending upon the test results.

Commercially available testers are able to operate much more rapidly than prior art component handlers. Thus, the testing and sorting rate is severely limited by prior art component handlers. The low testing and sorting rates now obtainable add significantly to production costs.

SUMMARY OF THE INVENTION

The present invention provides a component handler which enables the tester to work at a much greater speed to thereby substantially increase the testing rate. In addition the component handler greatly increases the sorting rate. To increase the testing rate, a large number of the components are retained in a holder and each component is rapidly sequentially electrically coupled to a tester which performs whatever tests are desired. This bulk holding arrangement eliminates separate handling of the chips during testing and, therefore, it materially contributes to a high testing rate.

To increase the sorting rate, the test results are stored in a memory, and the memory is then used to selectively remove components from the holder in accordance with the test results. The information in the memory can be used in various ways to effect a sorting function. However, to obtain a high sorting rate, the memory is usuable to simultaneously remove many of the components from the holder. With the present invention the memory serves not only a memory, but also as an implement to remove components from the holder in accordance with the test results.

In order to permit the memory to remove components from the holder, the holder and memory must be constructed and arranged for cooperation with each other. This can be advantageously accomplished by providing a holder having plurality of openings adapted to receive the components, respectively. The memory includes a plurality of ejector members, one being provided for each of the openings. In order to permit the ejector members to cooperate with the associated openings, the openings and ejector members are arranged in substantially identical patterns.

The ejector members can be of any construction which will allow them to be programmed to remove components from the holder. In a construction which is preferred because of its effectiveness and simplicity, the ejector members are mounted for movement on a body between an extended or ejecting position and a retracted or non-ejecting position. The programming of the memory includes the positioning of the ejector members in one of these positions. Another advantage of this construction is that the ejector members can be used to provide a visible display of the test results.

With the memory fully programmed, the memory and the holder are juxtaposed so that those ejector members which are in the extended position can extend into the corresponding openings of the holder to eject the associated components into an appropriate bin. Thus, all components designated for a given bin are simultaneously ejected from the holder.

The manner in which the components remaining in the holder are ejected will depend upon the requirements for the sorting function. For example, if the test is a simple go-no-go test, those components remaining in the holder may be dumped or ejected into a seond bin. However, if the components are to be divided into more than two bins in accordance with the characteristics determined by the test, then the memory may include a plurality of the bodies, each having ejector members mounted for movement thereon. With this latter arrangement, the several bodies and the holder are sequentially juxtaposed so that corresponding groups of the components are sequentially ejected into separate bins.

It is important that the components be held so as to permit each of them to be sequentially electrically coupled to the tester. This can advantageously be accomplished by providing holding means which includes a holding plate having a plurality of openings therethrough for receiving the components, respectively. The holding plate is sandwiched between a contact plate and a ground plate. The contact plate has a plurality of contacts mounted thereon adapted to engage the components, respectively. The ground plate provides a common ground for coupling all of the components to the tester. Accordingly, by sequentially coupling the testing means to each of the contacts of the contact plate, each of the components can be electrically tested.

To facilitate the ejection of the components from the holding plate, the contact plate is preferably removably mounted on the holding plate and the ground plate has apertures therein in registry with the openings, respectively, of the holding plate. Thus, by first removing the contact plate the ejector members can be inserted through the aperture of the ground plate and into the openings to selectively eject the components.

The tester provides a testing signal for each of the components which is indicative of the results of the test of such component. These testing signals are utilized to program the ejector. Although the ejector can be programmed utilizing various different mechanical means, such means can advantageously include a solenoid to urge the ejector members to the extended or ejecting position.

It is necessary to retain the ejector members which have been moved to the ejecting position in that position. Accordingly, the present invention provides means responsive to the positioning of one of the ejector members in the extended position for automatically retaining such ejector member in such position. After the memory has been completely programmed, then the ejector members are positively locked in the extended position.

3

The invention can best be understood by reference to the following description taken in connection with the accompanying illustrative drawings.

BRIEF DESCRIPTION OF THE DRAWINGS

FIG. 1 is a schematic view of a testing and sorting apparatus constructed in accordance with the teachings of this invention.

FIG. 2 is a perspective view of a capacitor chip.

FIG. 3 is an enlarged fragmentary sectional view taken generally along line 3—3 of FIG. 1 with the rolling contact shown engaging one of the contact elements of the contact plate.

FIG. 4 is a fragmentary sectional view through the loader, holding plate and ground plate illustrating the loading of components into the holding plate. The gate is partially withdrawn from the holding plate.

FIG. 5 is an exploded perspective view of a portion of one of the ejector units.

FIG. 6 is an enlarged, fragmentary, sectional view taken generally along line 6—6 of FIG. 5.

FIG. 7 is a sectional view showing one of the ejector units, the holding plate and the ground plate. The figure illustrates how the ejector selectively ejects components from the holding plate.

DESCRIPTION OF THE PREFERRED EMBODIMENT

FIG. 1 shows a testing and sorting apparatus 11 including a component handler 12 and a tester 17. The component handler 12 includes a retaining or holding means 13 for holding a plurality of components 15 (FIG. 2), and an ejector which includes a plurality of identical ejector units 19, 19a and 19b. The apparatus 11 is adapted to test and sort a variety of components, such as capacitors, diodes, and resistors, and the component 15 is shown merely be way of example. The component 15 shown in FIG. 2 is a capacitor chip of conventional construction and includes a dielectric 21 and conductive electrodes 23 adhered to the opposite ends of the dielectric. The dielectric 21 maay be a ceramic, and the electrodes 23 may be silver plates. Although the component 15 could be of various configurations, in the embodiment illustrated it is in the form of a somewhat elongated, rectangular solid and the faces of the electrodes 23 are nearly square. The components 15 are characteristically very small.

Although the retaining means 13 could be of various different configurations, FIG. 3 illustrates a preferred construction. The retaining means 13 shown in FIG. 3 includes a holding plate 25 sandwiched between a ground plate 27 and a contact plate 29. The holding plate 25 is constructed of nonconductive material such as an appropriate plastic. The holding plate 25 has a plurality of openings 31 extending completely therethrough and arranged in a predetermined pattern. Although any number of the openings 31 may be provided, in order to have a high testing rate, a very large number of the openings 31 are preferably provided. The cross sectional configuration of each of the openings 31 can be selected to accommodate the configuration of the component 15. In the embodiment illustrated, each of the openings 31 is cylindrical. One of the components 15 is loaded into each of the openings 31 by any suitable procedure, one of which is described hereinbelow with reference to FIG. 4.

4

The ground plate 27 is adhered to the lower face of the holding plate 25. The ground plate 27 is conductive and may be made of a metal. The ground plate 27 has a plurality of apertures 33 extending therethrough with each of the apertures being coaxial with an associated one of the openings 31. The apertures 33 are of smaller cross sectional dimensions than the openings 31 so that a shoulder 35 is formed on which the associated component 15 can rest. Each of the shoulders 35 is engaged by the lower electrode 23 of the associated component 15. Accordingly, the ground plate 27 simultaneously engages all of the components 15 and forms a common ground.

The contact plate 29 is releasably affixed to the upper face of the holding plate 25 in any suitable manner such as by screws 37 (FIG. 1). The position of the contact plate 29 relative to the holding plate 25 is accurately established by one or more dowel pins 39 carried by the contact plate and received in cooperating bores 41 formed in the holding plate 25. The contact plate 29 assists in holding the component 15 within the openings 31 and provides for sequentially electrically coupling each of the components to the tester 17.

Although these functions could be carried out in different ways, in the embodiment shown in FIG. 3, the contact plate 29 includes a body 43 in the form of a plate coextensive with the holding plate 25 and a plurality of conductive elements 45 mounted for movement in passages 47 formed in the body. The passages 47 are coaxial with the openings 31, respectively. One of the conductive elements 45 is provided for each of the openings 31. Each of the conductive elements 45 is biased downwardly (as viewed in FIG. 3) by a spring 49 which resiliently loads the inner end of the conductive element 45 into engagement with the upper electrode 23 of the associated component 15. Thus, each of the components 15 is mechanically clamped between the associated shoulder 35 and the inner end of the associated conductive element 45.

The outer end of each of the conductive elements 45 defines a contact 51 which is exposed at the upper face of the body 43. To prevent shorting of the contacts 51, the body 43, in the embodiment illustrated, is constructed of a nonconductive material such as an appropriate plastic material.

To load the components 15 into the openings 31, it is necessary to remove the contact plate 29 from the holding plate 25. Although loading of components 15 into the holding plate could be accomplished in many different ways, employing a funnel plate 53 as shown in FIG. 4 very rapidly loads the components. As shown in FIG. 4, the funnel plate 53 includes a plurality of passages 55, one for each of the openings 31. The passages 55 are arranged in the same pattern as the openings 31. The passages 55 are maintained in coaxial alignment with the openings 31, respectively, by a plurality of dowel pins 57 (only one being shown in FIG. 4) and the bores 41. Each of the passages 55 has an outwardly flared or funnel-shaped outer end 59.

In use of the funnel plate 53, the funnel plate is positioned on a gate 61 which is in the form of a plate sized to close the lower ends of all of the passages 55. A large number of the components 15 are distributed over the upper face of the funnel plate 53, and the funnel plate and the gate 61 are vibrated together either manually or by a suitable apparatus (not shown) to cause one of the components 15 to enter each of the passages 55 with such entry being facilitated by the funnel-shaped sctions 59. The excess components 15 are wiped off of the upper face of the funnel plate 53.

The funnel plate 53 and the gate 61 are then positioned on the upper face of the holding plate 25 with the gate 61 blocking communication between the passages 55 and the openings 31. The gate 61 is then withdrawn from between the holding plate 25, and the funnel plate 53 to allow the components 15 to fall by gravity into the associated openings 31. In the position shown in FIG. 4, the gate 61 is partially withdrawn. The funnel plate 53 is then removed, and the contact plate 29 is mounted on the holding plate utilizing the screws 37 as shown in FIGS. 1 and 3.

With the components 15 thus loaded into the openings 31, the test of the components can be begun. Whether the components 15 are tested simultaneously or sequentially, depends upon the characteristics of the tester 17. In the embodiment of the invention shown in the drawings, it is assumed that the tester 17 is adapted to sequentially test the components 15. Accordingly, a circuit is completed between the tester 17 and each of the components in sequence.

This is accomplished by relatively moving a rolling contact 63 over the contacts 51. In the embodiment illustrated, the retaining means 13 is stationary and the rolling contact 63 is rolled over the contacts 51 either manually or by any suitable apparatus (not shown). The rolling contact 63 is suitably electrically coupled to the tester 17 by a conductor 65 (FIG. 1), and the ground plate 27 is coupled to the tester by a conductor 67. Thus, a circuit is completed from the tester 17 through the conductor 65, the contacts 63 and 51, the conductive element 45, the component 15, the ground plate 27, and the conductor 67. The rolling contact 63 can be moved continuously or intermittently so long as the circuit between the tester 17 and the component 15 being tested is maintained for a sufficient period of time to allow the tester to perform the necessary tests. The rolling contact 63 can follow any predetermined path of movement so long as all of the contacts 51 are ultimately contacted by it.

The component handler 12 can be used with many different testers 17 and the construction of the tester will vary depending upon the nature of the test desired. Generally, the tester 17 should be capable of performing the test rapidly and of providing a testing signal indicative of the results of the test. By way of illustration, if the component 15 being tested is a capacitor chip, the tester 17 may perform tests to determine capacitance rating, dissipation factor, and forward and reverse leakage. The tester 17 which will perform these and other functions and provide a testing signal for each component tested is known as the GR 1683 and is available from General Radio, Irvine, California.

The testing signals from the tester 17 are utilized to program the ejector units 19, 19a and 19b. Although three of these ejector units have been illustrated, any numer can be employed depending upon the sorting functions desired, and the showing of three ejector units should be taken as purely illustrative.

The ejector units 19-19b may be of various different constructions. FIGS. 5 and 6 show one preferred construction for the ejector unit 19, it being understood that the ejector units 19a and 19b may be identical to the ejector unit 19.

The ejector unit 19 includes a body 69 having a plurality of ejector members 71 mounted for movement thereon between a non-ejecting or retracted position (the lower position as viewed in FIG. 6) and an extended or ejecting position (the upper position as viewed in FIG. 6). Although the body 69 can be of various constructions, in the embodiment illustrated, it includes spacer plates 73 and 75 of nonmagnetic material spaced apart by a generally U-shaped strip 77 to define a gap 79. The U-shaped strip provides access to the gap 79 from the periphery of the body 69 as shown in FIG. 5. Magnetic plates 81 and 83 are appropriately affixed to the outer faces of the spacer plates 73 and 75, respectively. Similarly, the spacer plates 73 and 75 are appropriately affixed to the circumscribing strip 77.

The body 69 has stepped passages 85 extending completely therethrough with the portion of such passages defined by the magnetic plates 81 and 83 being of smaller cross sectional area. The passages 85 are arranged in a pattern which is identical to the pattern formed by the openings 31.

The ejector members 71 may be of various different constructions. However, in the embodiment illustrated, each of the ejector members 71 is in the form of an ejector pin and is constructed of magnetic material. Each of the ejector members 71 includes an enlarged central portion 87 which cooperates with the reduced diameter portions of the passages 85 to captivate the ejector members in the body 69.

The ejector members 71 are automatically releasably retainable in either the ejecting or non-ejecting positions by the magnetic plates 81 and 83. The ejector members 71 and the magnetic plates 81 and 83 cooperate to cause the ejector members to snap to one position or the other depending upon which side of center the ejector member is on. Thus, the ejector members 71 are bistable.

The positions of the ejector members 71 establishes a program. Accordingly, it is necessary to position the ejector members 71 in accordance with the testing signals received from the tester 17. This, of course, can be accomplished in many different ways. In the embodiment illustrated, the ejector members 71 are manually movable from the ejecting position to the non-ejecting position, using if necessary an appropriate implement or pins to get the ejector members 71 overcenter.

In the embodiment illustrated, the ejector members 71 are moved from the non-ejecting position to the ejecting position by a solenoid 89. Although one solenoid 89 could be provided for each of the ejector members 71, in the embodiment illustrated only one solenoid is provided for the ejector unit 19. The solenoid 89 is movable with the rolling contact 63 along a corresponding path so that the solenoid is always positioned adjacent an ejector member 71 which corresponds to the component 15 being tested. In this manner the decision as to which ejector member 71 to position is made.

The solenoid 89 includes a plunger 91 which is movable when the solenoid is energized to drive the adjacent ejector member 71 into the ejecting position or sufficiently toward the ejecting position so that the magnetic plate 81 can draw the ejector member the rest of the way to the ejecting position. The plunger 91 may enter the passage 85 sufficiently to accomplish this. The plunger 91 is then immediately and rapidly returned to the retracted position shown in FIG. 6 in any suitable manner such as by a return spring (not shown).

The testing signal from the tester 17 can be processed in any suitable manner so as to cause the solenoid 89 to be energized or de-energized. For example, as shown in FIG. 1, a conductor 93 couples the tester 17 to an amplifier 95. The output from the amplifier 95 is fed to the solenoid 89. By way of example, if the solenoid 89 is to be energized, the tester 17 may provide a signal on the conductor 93 which is sufficient, when amplified by the amplifier 95, to energize the solenoid 89. If the solenoid 89 is to remain de-energized, then the tester 17 provides no electrical output to the conductor 93. In this latter event, the testing signal has a zero amplitude.

The use of multiple ejector units as a memory and as sorting means can best be understood by reference to a particular example. Thus, it may be desirable to test capacitor chips to determine whether the capacitance of each of the chips is (a) within allowable tolerances, (b) too high, or (c) too low and to sort or separate the acceptable components 15, i.e., those having a capacitance rating within the allowable tolerances, from those that do not. Furthermore, it may be desirable to separate the components 15 having too great a capacitance from those having too small a capacitance.

To accomplish this, the three ejector units 19, 19a and 19b may be employed. As shown in FIG. 1, the ejector units 19a and 19b are operated, respectively, by solenoids 89a and 89b. Similarly, the solenoids 89a and 89b are selectively energizable by signals carried thereto by way of conductors 93 and 93b and amplifiers 95a and 95.

Initially all of the ejector members 71 of all of the ejector units are in the non-ejecting position. If a particular component has a capacitance rating within the allowable tolerances, the tester 17 transmits a testing signal to the ejector unit 19 via conductor 93 to energize the associated solenoids 89 to thereby move the ejector member 71 to the ejecting position. Thus, each time the rolling contact 69 provides a connection with an acceptable component 15, the associated ejector member 71 of the ejector unit 19 is moved to the ejecting position by the solenoid 89. Similarly, each time a component is found to have a capacitance rating above the upper limit, the tester 17 provides a signal on conductor 93 and this causes the corresponding ejector member 71 of the ejector unit 19a to be moved to the ejecting position by the solenoid 89a. Likewise, if a component 15 has a capacitance rating below allowable tolerances, the associated ejector member 71 of the ejector unit 19b is moved to the ejecting position by the solenoid 89b.

In the embodiment illustrated, the decision as to which of the solenoids 89, 89a and 89b is to be energized in response to a given test is made by the tester 17 in that it provides an energizing signal on only one of the conductors 93, 93a and 93b in response to each test. Similarly, the decision as to which of the ejector members 71 of the selected ejector unit is to be positioned is made mechanically, i.e., by the appropriate positioning of the solenoids 89, 89a and 89b with respect to their associated ejector units simultaneously with the positioning of the rolling contact 63. If desired, a suitable carriage (not shown) can be provided to effect simultaneous movement of, and corresponding positioning of, the rolling contact 63 and the solenoids 89, 89a and 89b.

After the rolling contact 63 has moved over all of the contacts 51, the three ejector units have stored therein all of the test information regarding the components 15 tested. Thus, the ejector units 19, 19a and 19b provide a memory for the storage of test data. Moreover, the ejector members 71 provide a visible display of the test results. For example, to ascertain which category a particular component 15 falls within, it is only necessary to look at the locations on the three ejector units which correspond to the location of such component in the retaining means 13 and to note which of the ejector units has the associated ejector member in the ejecting position. Accordingly, it is possible to manually sort the tested components 15 into three categories in accordance with the test results.

However, this same result can be accomplished more rapidly and with no possibility for operator error by utilizing the ejector units 19–19b as a tool for ejecting the components 15 from the holding plate 25. To accomplish this, a locking plate 97 (FIGS. 5 and 7) is slid into the gap 79. The locking plate 97 is engageable with the lower ends of each of the ejector members 71 in the ejecting position to lock them in the ejecting position. The ejector members 71 of the ejector units 19a and 19b are locked in position in an identical manner.

The contact plate 29 is then removed from the holding plate 25 and the ejector unit 19 and the ground plate 27 are juxtaposed as shown in FIG. 7 by moving either or both of the plates. This causes the ejector members 71 which are in the ejecting position to enter the corresponding apertures 33 and openings 31 to eject the associated components 15 out through the upper ends of the openings. Thus, in the first ejection all of the components 15 having a capacitance rating within allowable tolerances are ejected and can be placed into an appropriate receptacle (not shown). The components 15 remaining in the holding plate 25 are ejected in an identical manner by either the ejector unit 19a or the ejector unit 19b depending upon the test results. This is accomplished by sequentially positioning the holding plate 25 and the ejector units 19a and 19b in the same manner shown in FIG. 7.

Any number of the ejector units 19–19b can be employed depending upon the number of tests which are conducted. For a simple go-no-go type of test, only one of the ejector units would have to be employed in that a standard ejector having pins for all of the openings 31 could be utilized to eject the remaining components after the initial ejection by the single ejector unit. Although the ejector units are shown as separate structure, obviously all that is required for an ejector unit is a programmable cluster of ejector members, and these clusters may be mounted on one or more bodies as may be desired.

Although an exemplary embodiment of this invention has been shown and described, many changes, modifications and substitutions may be made by one having ordinary skill in the art without necessarily departing from the spirit and scope of this invention.

I claim:

1. A testing and sorting apparatus for electrical components comprising:
   means for holding a plurality of components to be tested in a predetermined pattern;
   said holding means supporting said components in spaced relation and including common means electrically contacting each component and individual contact means electrically contacting each component;

testing means sequentially electrically contacting each separate contact means to establish an electrical connection with said common means through the component being tested, said testing means including means providing a testing signal for each of the components, each of said testing signals being indicative of the results of the test of the associated component;

programmable ejector means for ejecting predetermined selected components from the holding means in accordance with a program;

means responsive to the testing signals for programming the ejector means in accordance with the testing signals; and said ejecting means including a body having a face and a plurality of ejector pins corresponding to predetermined selected components and mounted on said body for movement relative to said body, said programming means including means for positioning said ejector pins relative to said face.

2. An apparatus as defined in claim 1 wherein said ejector means includes at least one ejector member for each of said components held by the holding means, said holding means retains the components in a first pattern and at least one group of said ejector members is arranged in a pattern which is substantially identical to said first pattern.

3. A component handler for use with a testing apparatus wherein the testing apparatus is adapted to test at least one electrical characteristic of each of the components and to provide a testing signal for each of the components which is indicative of the results of the test of such components, said component handler comprising:

a holder for holding a plurality of the components to be tested in a predetermined pattern;

said holder supporting said components in spaced relation and including common means electrically contacting each component and individual contact means electrically contacting each component, a memory including a body having a face and a plurality of memory members mounted for movement on said body between a first position in which the memory members project from a face of said body and a second position in which the memory members project a lesser distance from said face; and means responsive to the testing signals to position the memory members in one of said positions whereby the positions of said memory members relative to said body are controlled by the test results.

4. A component handler as defined in claim 3 including means responsive to positioning one of the memory members in said first position for automatically retaining said one memory member in said first position.

5. A component handler as defined in claim 3 wherein said holder has a plurality of openings for receiving said components, respectively, said memory members and said openings are arranged in corresponding patterns, said memory and said holder are relatively positionable in closely adjacent relationship, and said memory members in said first position project sufficiently from said face to serve as ejector members for ejecting the corresponding components from the carrier.

6. A component handler as defined in claim 3 including magnetic means for releasably holding said memory members in at least one of said positions thereof.

7. A component handler as defined in claim 3 wherein said last mentioned means includes a solenoid, said solenoid being energizable to cause movement of at least one of the memory members from one of said positions to the other of said positions.

8. A component handler for use with a testing apparatus wherein the testing apparatus is adapted to test the components and to provide a testing signal for each of the components which is indicative of the results of the test of such components, said component handler comprising:

a holder for holding the components to be tested, said holder having a plurality of openings therein adapted to receive the components, respectively;

an ejector including a body and a plurality of ejector members, each of said ejector members being mounted for movement on said body between an ejecting position in which the ejector member projects from a face of said body and a non-ejecting position in which the ejector member projects a lesser distance from said face;

means responsive to said testing signals for positioning the associated ejector members in one of said positions whereby the positions of each of said ejector members is controlled by the test results of the corresponding component; and said openings and said ejector members being arranged in corresponding patterns and at least portions of said ejector members being sized to be received within portions of said openings, respectively, whereby said ejector members which are positioned in the extended position can eject components from said holder.

9. A component hander as defined in claim 8 wherein said holder includes a holding plate having said openings extending therethrough for receiving said components, respectively, said component handler includes a contact plate and a plurality of contacts carried by said contact plate, said contact plate being adapted to confront said holding plate with said contacts being engageable with the components in said openings, respectively.

10. A component handler as defined in claim 9 including a ground plate adapted to make electrical contact with the components in said holding plate, said holding plate being adapted to be sandwiched between said contact plate and said ground plate.

11. A component handler as defined in claim 10 wherein said ground plate has a plurality of apertures therein in registry respectively with the openings of the holding plate, and said component handler includes means for releasably mounting the contact plate on said carrier plate.

12. A method of testing a plurality of electrical components comprising:

providing a holder having the components retained thereon;

said holder including individual means electrically contacting each component and common means electrically contacting each component;

testing at least one electrical characteristic of each of the components while the components are retained on the holder by contacting the individual means contacting each component;

providing a removal device having a plurality of adjustable removal members with each of said removal members corresponding to a component retained by the holder;

adjusting the position of said removal members in accordance with the results of the test of said components, respectively, whereby each of the removal members is adjusted in accordance with the results of the test on the corresponding component; and removing at least some of the components from the holder utilizing the adjusted removal members whereby components are removed or are allowed to remain in the holder in accordance with the results of the test of such components.

13. A method as defined in claim 12 wherein said step of removing includes simultaneously removing a plurality of the components from the holder utilizing the adjusted removal members.

14. A method as defined in claim 12 wherein said step of utilizing includes juxtaposing the holder and the removal device subsequent to said step of adjusting so that appropriately adjusted removal members can remove the corresponding components from the holder.

15. A method of testing a plurality of components comprising:

providing a holder having a plurality of openings extending therethrough with the openings being arranged in a predetermined pattern;

loading the components into the openings, respectively;

testing the components while the components are in said openings of the holder;

providing an ejector including a body having a face and a plurality of movable ejector members arranged in said predetermined pattern, each of said ejector members being adapted to be associated with one of said components in said holder;

positioning each of said ejector members in extended or retracted positions relative to a face of the body in accordance with the results of the test of the corresponding component in the holder; and inserting the ejector members which are in the extended position into the corresponding openings in the holder to eject the associated components whereby components are ejected from the carrier in accordance with the results of said step of testing.

16. A method as defined in claim 15 including automatically retaining the ejector members which are positioned in the extended position as a result of said step of positioning and subsequently positively locking the automatically retained ejector members in the extended position.

17. A method as defined in claim 15 wherein the components are tested sequentially and said step of positioning is carried out automatically, and said step of inserting includes juxtaposing the ejector and the holder and simultaneously inserting the ejector members in the extended position into the corresponding openings subsequent to said step of positioning.

18. A method as defined in claim 15 wherein said body is a first body, said face is a first face, and said movable ejector members are first movable ejector members, said ejector including a second body having a second face and a plurality of second movable ejector members mounted on the second body and arranged in said predetermined pattern for movement relative to said second face, each of said second ejector members being adapted to be associated with one of said components in said holder, said method including positioning each of said second ejector members in extended or retracted positions relative to the second face of the second body in accordance with the results of the test of the corresponding component in the holder, and inserting the second ejector members which are in the extended position into the corresponding openings in the holder to eject the associated components, said last mentioned step of inserting being carried out subsequently to said first mentioned step of inserting.

19. A method of testing a plurality of electrical components comprising:

providing a holder having the components retained thereon;

said holder including individual means electrically contacting each component and common means electrically contacting each component;

testing at least one electrical characteristic of each of the components while the components are retained on the holder by contacting sequentially the individual means contacting each component;

providing a memory having a plurality of movable memory members;

controlling the position of said memory members in accordance with the results of the test of said components; and sorting at least some of the components utilizing the positioned memory members whereby the components are sorted in accordance with the results of the test of such components.

20. A component handler for use with a testing apparatus wherein the testing apparatus is adapted to test electrical components and to provide a testing signal for each of the components which is indicative of the results of the test of such components, said component handler comprising:

means for holding a plurality of components to be tested in a predetermined pattern;

said holding means supporting said components in spaced relation and including common means electrically contacting each component and individual contact means electrically contacting each component;

programmable sorting means for sorting the components in accordance with a program;

said sorting means including a plurality of movable elements and means for mounting said movable elements for. movement relative to said mounting means, said sorting means being programmable by positioning said movable elements relative to said mounting means; and means responsive to the testing signals for positioning the movable elements relative to said mounting means to program the sorting means in accordance with the testing signals whereby components can be sorted in accordance with the results of the test.

21. A component handler as defined in claim 20 wherein a first group of said movable elements are provided for a first of the components and said positioning means positions at least one of said movable elements of said first group in response to the testing signal for such first component.

* * * * *